United States Patent
Murayama et al.

(10) Patent No.: US 8,170,630 B2
(45) Date of Patent: May 1, 2012

(54) MOBILE TERMINAL DEVICE

(75) Inventors: Kazunori Murayama, Kawasaki (JP); Hiroyuki Tanaka, Kawasaki (JP); Jiro Takahashi, Kawasaki (JP); Atsuko Yamamoto, Kawasaki (JP); Masamichi Watanabe, Kawasaki (JP); Takehisa Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 310 days.

(21) Appl. No.: 12/363,307

(22) Filed: Jan. 30, 2009

(65) Prior Publication Data

US 2009/0233658 A1   Sep. 17, 2009

(30) Foreign Application Priority Data

Mar. 17, 2008   (JP) .................................. 2008-68474

(51) Int. Cl.
*H04M 1/00* (2006.01)
(52) U.S. Cl. ..................... 455/575.3; 324/220; 422/400; 16/330
(58) Field of Classification Search ............... 455/575.3, 455/575.4, 575.8; 349/58; 362/88; 224/197
See application file for complete search history.

(56) References Cited

U.S. PATENT DOCUMENTS

| | | | | |
|---|---|---|---|---|
| 4,283,901 A * | 8/1981 | Schieser et al. | .................... | 53/75 |
| 7,228,741 B2 * | 6/2007 | Georgeson et al. | ............. | 73/634 |
| 2004/0181909 A1 * | 9/2004 | Kawamoto | ....................... | 16/330 |
| 2004/0215966 A1 * | 10/2004 | Elteto | ............................ | 713/182 |
| 2005/0014536 A1 * | 1/2005 | Grady | ............................ | 455/573 |
| 2005/0204508 A1 * | 9/2005 | Duan et al. | ....................... | 16/303 |
| 2005/0241418 A1 * | 11/2005 | Damrath et al. | ................ | 74/84 S |
| 2006/0076951 A1 * | 4/2006 | Nestleroth et al. | .............. | 324/220 |
| 2006/0232425 A1 * | 10/2006 | Ueno | .......................... | 340/572.8 |
| 2007/0094843 A1 * | 5/2007 | Yang | ................................ | 16/330 |
| 2008/0213135 A1 * | 9/2008 | Burke et al. | ................... | 422/102 |
| 2010/0162812 A1 * | 7/2010 | Parkinson | ........................ | 73/299 |

FOREIGN PATENT DOCUMENTS

| | | |
|---|---|---|
| JP | 5-165784 | 7/1993 |
| JP | 6-268724 | 9/1994 |
| JP | 2004-308710 | 11/2004 |
| JP | 2006-093510 | 4/2006 |
| JP | 2006-280388 | 10/2006 |

OTHER PUBLICATIONS

Japanese Office Action for corresponding Japanese Application 2008-068474; dated Nov. 22, 2011.

* cited by examiner

*Primary Examiner* — Nick Corsaro
*Assistant Examiner* — Mahendra Patel
(74) *Attorney, Agent, or Firm* — Staas & Halsey LLP

(57) ABSTRACT

A mobile terminal device including a first housing, a second housing and a hinge foldably connecting the first housing and the second housing is provided. The mobile terminal device includes a hinge including a hinge mechanism which rotatably connects the first housing and the second housing. The device includes a flexible joint which liquid-tightly connects the first housing and the second housing and liquid-tightly contains the hinge mechanism.

5 Claims, 7 Drawing Sheets

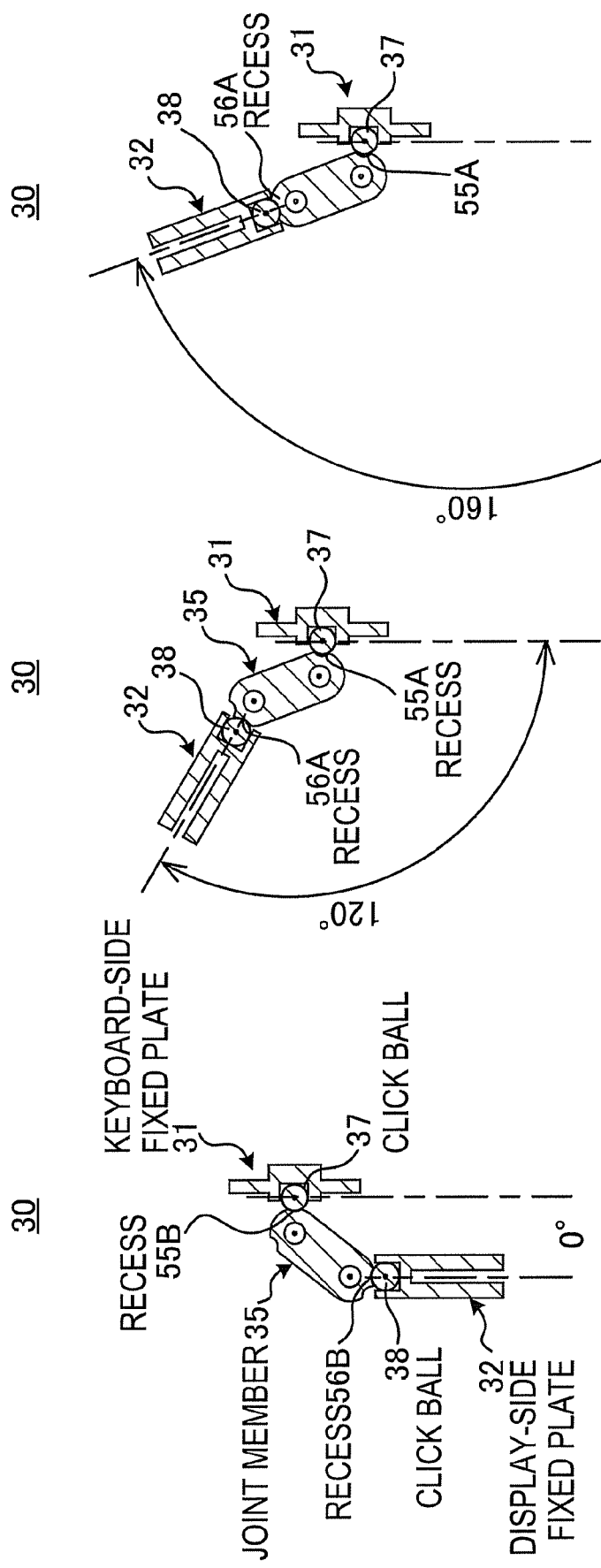

MOBILE TERMINAL DEVICE

CROSS-REFERENCE TO RELATED APPLICATION(S)

This application is related to and claims priority to Japanese patent application no. 2008-68474 filed on Mar. 17, 2008 in the Japan Patent Office, and incorporated by reference herein.

FIELD

The embodiments discussed herein are directed to a foldable mobile terminal device including a hinge mechanism.

BACKGROUND

In recent years, various mobile types of cellular phones have been provided. A common type of cellular phone, is a foldable cellular that have excellent operability. The folding of the cellular phone can prevent erroneous operations of keys. FIG. 1 illustrates an example of a conventional foldable cellular phone.

As illustrated in FIG. 1 a foldable cellular phone 1 includes a display-side housing 2 and a keyboard-side housing 3 that are connected with a hinge 4. The cellular phone 1 can be used when the display-side housing 2 is opened with respect to the keyboard-side housing 3 around the hinge 4. When the cellular phone is not used, it may be carried so that the display-side housing 2 is folded on the keyboard-side housing 3. Further, within the hinge 4, there can be wiring that electrically connects the display-side housing 2 and the keyboard-side housing 3.

Conventionally, in such a cellular phone 1, the hinge 4 includes a mechanism in which a shaft and a bearing are combined, and a hard ABS resin material (Acrylonitrile-Butadiene-Styrene resin), or the like, have been used. However, it has been difficult for the hinge 4 having the conventional structure to obtain high reliability in view of impact resistance, being water-tight, and the like. For example, with the hinge 4 molded with resin, operation may cause cracks of the case.

Conventionally, a hinge structure has been disclosed in which the hinge is not formed in combination of the shaft and the bearing, but formed of a silicone-based soft resin or rubber having elasticity; and a folding is performed by flexibly deforming the hinge itself. The hinge structure can improve the structure being watertight and impact resistance.

However, in the hinge structure disclosed conventionally, since the soft resin or the rubber are elastically deformed when being folded, the elastic restoring force makes it difficult to maintain the display-side housing 2 and the keyboard-side housing 3 in a folded state, and thus there has been a problem of poor usability.

In recent years, cellular phones that can receive terrestrial digital broadcasting have been provided, and it is desirable that the hinge include a tilt function that can adjust an open angle of the display-side housing 2 with respect to the keyboard-side housing 3. However, there has been a problem in that a hinge formed of the soft resin and the rubber cannot satisfactorily address such a problem.

SUMMARY

It is an aspect of the embodiments discussed herein to provide to a mobile terminal device having improved water-tightness, and impact resistance, in addition to usability.

The above aspects can be attained by a mobile terminal device including a first housing, a second housing and a hinge foldably connecting the first housing and the second housing, and a hinge including a hinge mechanism which rotatably connects the first housing and the second housing, and a flexible joint which liquid-tightly connects the first housing and the second housing and liquid-tightly contains the hinge mechanism.

The aspects and advantages of an exemplary embodiment may be e realized and attained by elements and combinations particularly as recited in the claims.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 7A, 7B, and 7C illustrate cross sectional views taken along line B-B of the hinge mechanism illustrated in FIG. 6.

DESCRIPTION OF EMBODIMENTS

Figure 1:
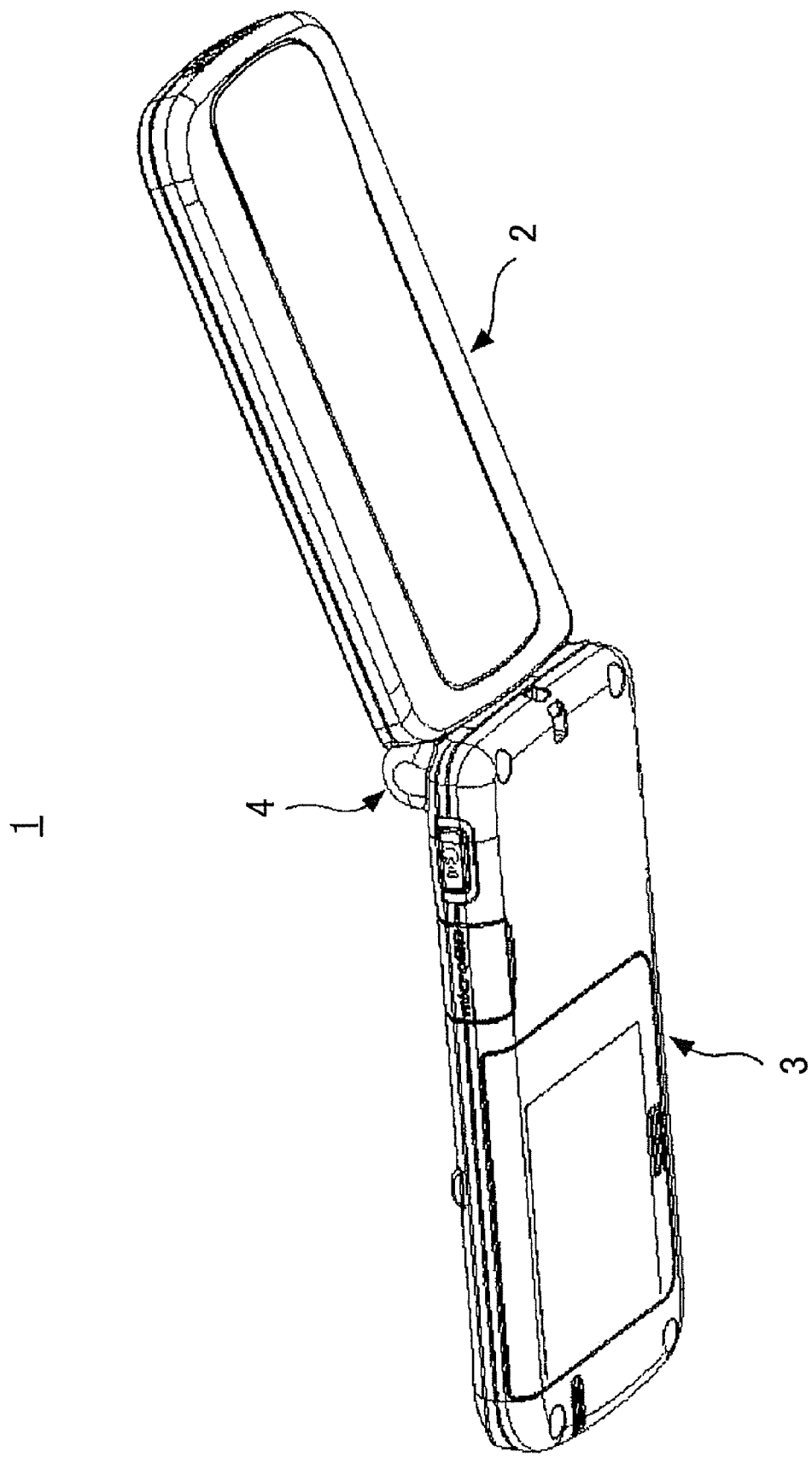
FIG. 1 illustrates a cellular phone.
Figure 2:
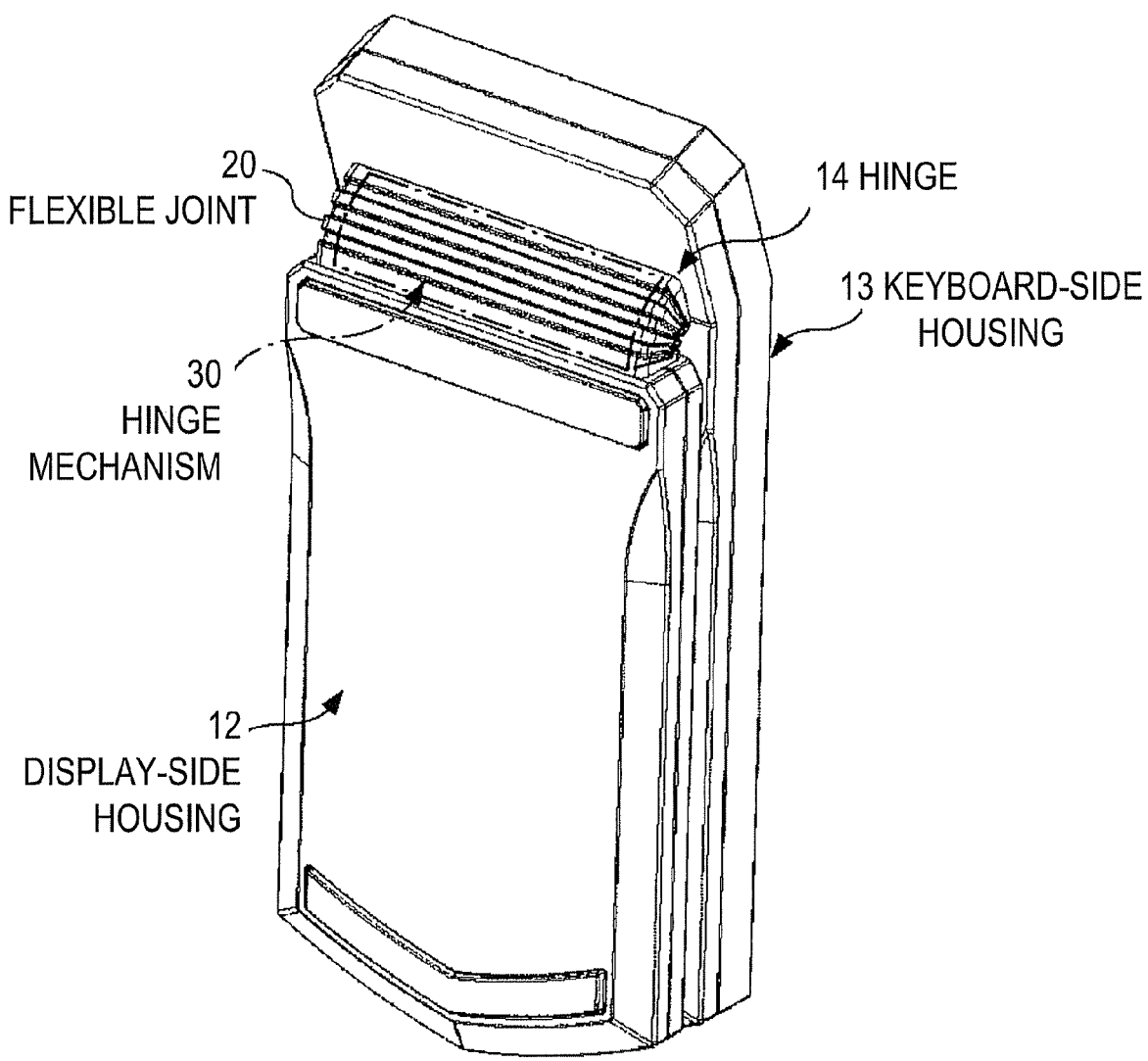
FIG. 2 illustrates a cellular phone according to an embodiment.

FIG. 2 illustrates cellular phone according to an embodiment. A cellular phone is exemplarily of mobile terminal devices. However, the embodiments herein are not limited to the cellular phone, but are applicable to other mobile terminal devices including those that may be folded by a hinge.

As illustrated in FIG. 2, a cellular phone 10 includes a display-side housing 12, a keyboard-side housing 13 and a hinge 14.

The display-side housing 12 includes a display device, an earpiece, and the like (not shown). The keyboard-side housing 13 includes a keyboard, cursor keys, a mouthpiece, and the like (not shown). The hinge 14 openably connects the display-side housing 12 and the keyboard-side housing 13. Thus, the display-side housing 12 can be folded with respect to the keyboard-side housing 13 by the hinge 14, and this allows both improving portability and preventing erroneous operations of keys.

Within the hinge 14, a flexible cable may be disposed that electrically connects the display-side housing 12 and the keyboard-side housing 13. Therefore, even when the display-side housing 12 and the keyboard-side housing 13 are formed so as to be foldable, electric parts disposed in the display-side housing 12 and electric parts disposed in the keyboard-side housing 13 can be electrically connected.

The hinge 14 includes a flexible joint 20 and a hinge mechanism 30. The flexible joint 20 may be formed of an elastic material, the inside of which is hollow. Rubber may be used as material of the flexible joint 20. However, other elastic materials may be used if they are flexible and deformable. The other elastic materials include e, for example, a soft resin and the like.

According to an embodiment, an accordion shape for the flexible joint 20 is used. However, the shape of the flexible joint 20 is not limited to the accordion shape, but may also be other shapes. The other shapes are, for example, a tubular shape and the like. The hinge 14 rotatably connects the display-side housing 12 and the keyboard-side housing 13, and the display-side housing 12 and the keyboard-side housing 13 are opened and closed with a large angle. The angle is, for example, approximately 160 degrees.

As illustrated in FIG. 2, since the disposed position of the flexible joint 20 in a folded state is at the end of the cellular phone 10, the flexible joint 20 is subject to impact if the cellular phone 10 is dropped. Therefore, accordingly to an exemplary embodiment, the hinge 14 has shock-absorbing characteristics for improving reliability of the cellular phone 10. Thus, according to an exemplary embodiment, the flexible joint 20 has large deformation characteristics and shock-absorbing characteristics. In this regard, the tubular flexible joint can be expected to have shock-absorbing effect in a certain extent, while the accordion-shaped flexible joint can be expected more beneficial shock-absorbing effect. Taking account of the above, according to an exemplary embodiment that the flexible joint 20 have the accordion shape.

One end of the flexible joint 20 may be liquid-tightly fixed to the display-side housing 12, while the other end of the flexible joint 20 may be fixed to the keyboard-side housing 13. Thus, in an embodiment, water does not enter from the hinge 14 to the inside of the display-side housing 12 or the inside of the keyboard-side housing 13, so that the water-tightness of the cellular phone 10 can be improved. In this way, using the flexible joint 20 for the hinge 14 allows the water-tightness and impact resistance of the cellular phone 10 to be enhanced.

However, in the arrangement in which the housings 12, 13 are merely connected with only the flexible joint 20, because of the elastic restoring force of the flexible joint 20, it may be difficult to maintain the display-side housing 12 and the keyboard-side housing 13 in the folded state, and it may be difficult to have a tilt function pausing at any angle, and thus a problem in usability.

According to an exemplary embodiment, the hinge mechanism 30 may be within the flexible joint 20. The flexible joint 20 may be liquid-tightly connected to both the housings 12, 13, whereby the hinge mechanism 30 may be adapted to be liquid-tightly contained within the flexible joint 20.

Figure 3:
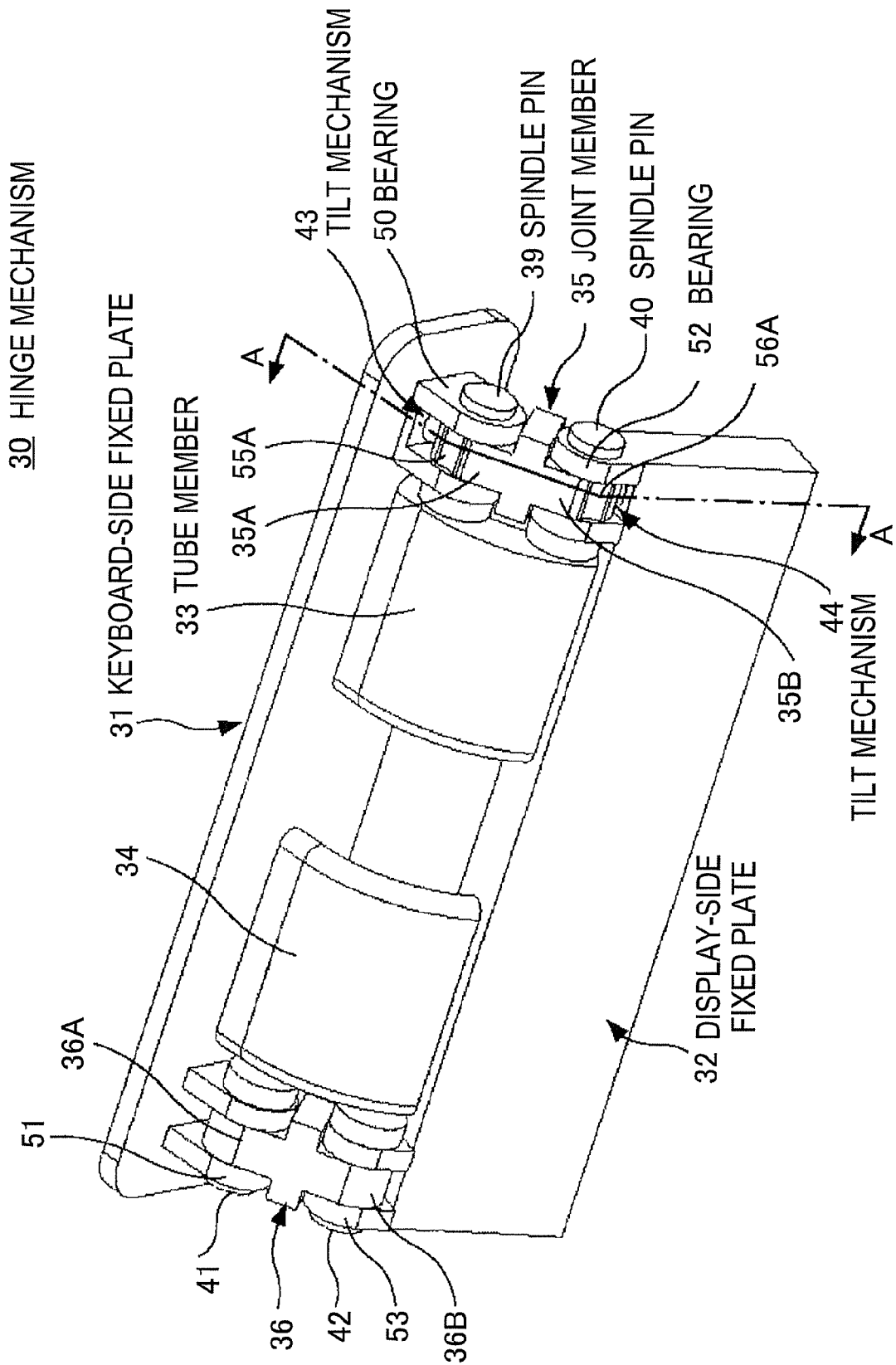
FIG. 3 illustrates an exemplary hinge mechanism provided in a cellular phone according to an embodiment.
Figure 4:
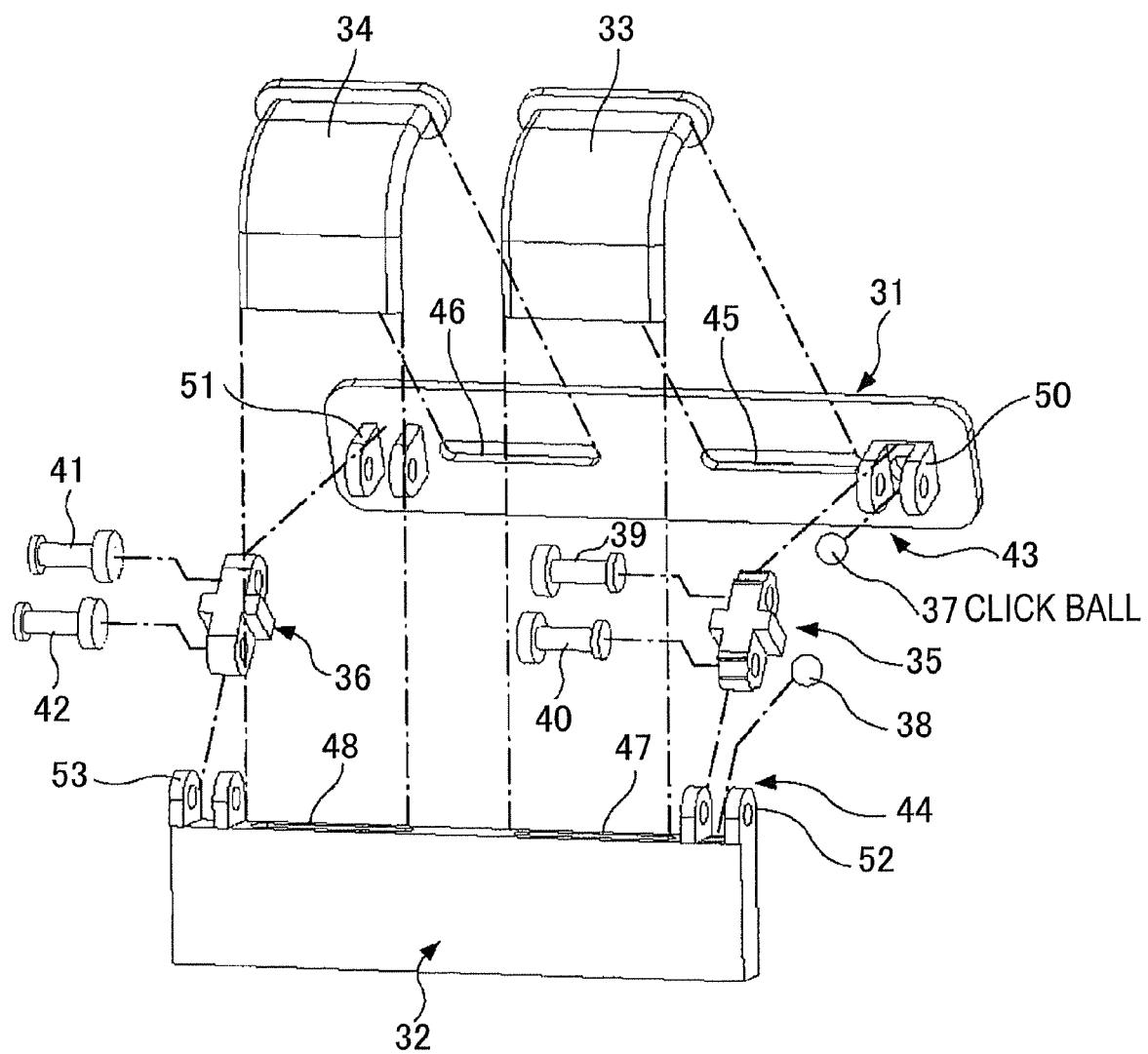
FIG. 4 illustrates an exemplary hinge mechanism provided in a cellular phone according to an embodiment.
Figure 5:
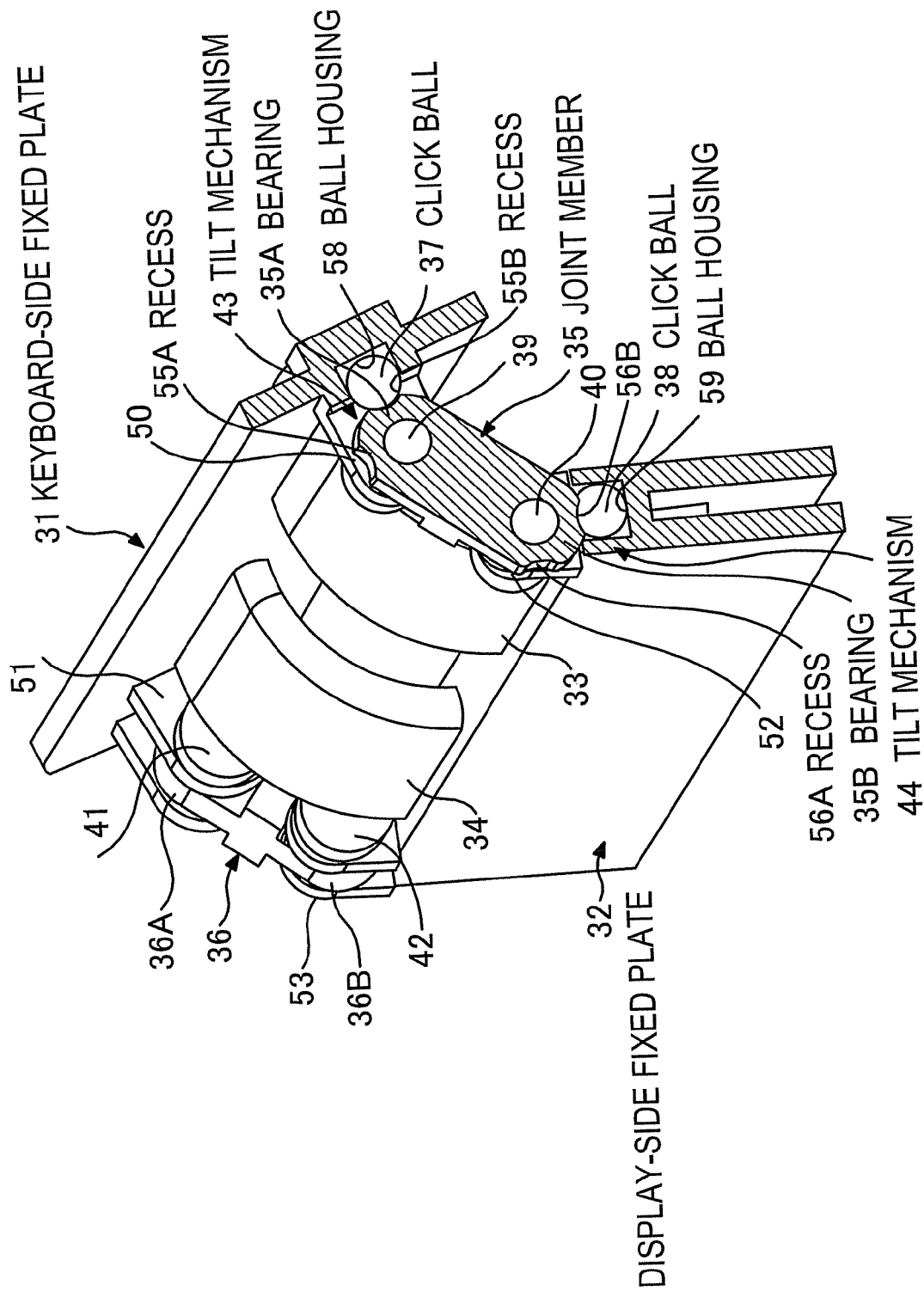
FIG. 5 illustrates a cross-sectional view taken along line A-A of FIG. 3.

FIG. 3 illustrates an exemplary hinge mechanism provided in the cellular phone according to the embodiment. FIG. 4 illustrates an exemplary hinge mechanism provided in the cellular phone according to the embodiment. FIG. 5 is a cross-sectional view taken along line A-A of FIG. 3.

The hinge mechanism 30 can include a keyboard-side fixed plate 31, a display-side fixed plate 32, tube members 33, 34, joint members 35, 36, and click balls 37, 38.

The keyboard-side fixed plate 31 may be a plate-like member and may be fixed to the keyboard-side housing 13. Two openings 45, 46 may be formed on the center portion of the keyboard-side fixed plate 31, and bearings 50 and 51 are formed on both sides thereof. The openings 45 and 46 are openings through which flexible substrates electrically connecting the display-side housing 12 and the keyboard-side housing 13 may be inserted. The joint members 35, 36 may be bearingly supported with the bearings 50, 51.

The display-side fixed plate 32 may be a plate-like member and may be fixed to the display-side housing 12. Two openings 47, 48 may be formed on the center portion of the display-side fixed plate 32, and bearings 52 and 53 may be formed on both sides thereof. The openings 47 and 48 may be openings through which the flexible substrates electrically connecting the display-side housing 12 and the keyboard-side housing 13 are inserted. The joint members 35, 36 may be bearingly supported by the bearings 52, 53.

The tube members 33, 34 are tubular members in a flattened tubular shape, and may be formed of material which has being watertight, such as rubber or resin. One end of the tube member 33 may be liquid-tightly connected to the opening 45 of the keyboard-side fixed plate 31, while the other end of the tube member 33 may be liquid-tightly connected to the opening 47 of the display-side fixed plate 32. Similarly, one end of the tube member 34 may be liquid-tightly connected to the opening 46 of the keyboard-side fixed plate 31, while the other end of the tube member 34 may be liquid-tightly connected to the opening 48 of the display-side fixed plate 32.

The flexible substrates which electrically connect the display-side housing 12 and the keyboard-side housing 13 are inserted into the insides of the tube members 33, 34. In this way, the flexible substrates are covered within the hinge 14 by the tube members 33, 34. Thus, even if the flexible joint 20 is damaged and water enters from the flexible joint 20 to the inside of the hinge 14, the tube members 33, 34 further prevent the water from entering the housings 12, 13, and water-tightness more improved The joint members 35, 36 may be disposed between the keyboard-side fixed plate 31 and display-side fixed plate 32 and serve to connect the fixed plates 31, 32. The joint members 35, 36 may be each formed of an elastic material. In an embodiment the elastic material is, for example, a hard silicone rubber.

The joint member 35 includes bearings 35A, 35B at both ends thereof. Through bores through which spindle pins 39, 40 may be inserted are formed in the bearings 35A, 35B, respectively. Similarly, the joint member 36 includes bearings 36A, 36B at both ends thereof. Through bores through which spindle pins 41, 42 are inserted are formed in the bearings 36A, 36B, respectively.

To connect the keyboard-side fixed plate 31 and the display-side fixed plate 32 using the joint member 35, the bearing 35A of the joint member 35 and the bearing 50 of the keyboard-side fixed plate 31 may be connected by the spindle pin 39, and the bearing 35B and the bearing 52 of the display-side fixed plate 32 are connected by the spindle pin 40. The bearing 50 and the joint member 35 may become rotatable around the spindle pin 39, and the joint member 35 and the bearing 52 may become also rotatable around the spindle pin 40.

To connect the keyboard-side fixed plate 31 and the display-side fixed plate 32 using the joint member 36, the bearing 36A of the joint member 36 and the bearing 51 of the keyboard-side fixed plate 31 may be connected with the spindle pin 41, and the bearing 36B and the bearing 53 of the display-side fixed plate 32 are connected with the spindle pin 42. The bearing 51 and the joint member 36 may become rotatable around the spindle pin 41, and the joint member 36 and the bearing 53 become also rotatable around the spindle pin 42.

When the hinge mechanism 30 is assembled, the spindle pin 39 and the spindle pin 41 are coaxially arranged, and the spindle pin 40 and the spindle pin 42 are also coaxially arranged. Thus, a relative movement of the keyboard-side fixed plate 31 and the display-side fixed plate 32 causes a first rotation of a first axis that may be defined by the spindle pin 39 and the spindle pin 41, and a second rotation of a second axis that may be defined by the spindle pin 40 and the spindle pin 42. Namely, the rotational movement of the keyboard-side fixed plate 31 and the display-side fixed plate 32 may be a two-axis rotation which rotates around the above first axis and second axis.

In the structure in which the keyboard-side fixed plate 31 and the display-side fixed plate 32 are connected by the joint member 35, there are provided tilt mechanisms 43 and 44 which can seize the keyboard-side fixed plate 31 and the display-side fixed plate 32 at predetermined folded angles as described later. The predetermined angles in an embodiment may be, for example, 0 degrees, 120 degrees, and 160 degrees. The tilt mechanism 43 may be disposed at the position where the bearing 35A may be bearingly supported by the bearing 50, while the tilt mechanism 44 may be disposed at the position where the bearing 35B may be bearingly supported by the bearing 52. The tilt mechanisms 43 and 44 will now be described mainly referring to FIG. 5.

The tilt mechanism 43 may be constructed of: the click ball 37 that may be disposed in the keyboard-side fixed plate 31; and recesses 55A, 55B which are formed on the bearing 35A of the joint member 35. The click ball 37 may be rollably housed in a ball housing 58 that may be formed in the bearing 50 of the keyboard-side fixed plate 31.

An outer circumference portion of the bearing 35A has a curved shape, that may be a concentric circle of the central rotation axis of the spindle pin 39, and the recesses 55A, 55B may be formed on the surface of the outer circumference portion. The recesses 55A, 55B may be engaged with the click ball 37 in accordance with rotation of the joint member 35 with respect to the keyboard-side fixed plate 31.

Under the condition that the click ball 37 and the recesses 55A, 55B are engaged, rotation of the display-side fixed plate 32 with respect to the keyboard-side fixed plate 31 may pause. Thus, under the condition that the click ball 37 and the recesses 55A, 55B are engaged, the display-side housing 12 and the keyboard-side housing 13 may be seized. In an embodiment, a separating angle between the recess 55A and the recess 55B may be set at 120 degrees.

The tilt mechanism 44 may be constructed of: the click ball 38 disposed in the display-side fixed plate 32, and recesses 56A, 56B formed on the bearing 35B of the joint member 35. The click ball 38 may be rollably-housed in a ball housing 59 formed in the bearing 52 of the display-side fixed plate 32.

An outer circumference portion of the bearing 35B has a curved shape, that may be a concentric circle of the central rotation axis of the spindle pin 40, and the recesses 56A, 56B may be formed on the surface of the outer circumference portion. The recesses 56A, 56B may bee engaged with the click ball 38 in accordance with rotation of the joint member 35 with respect to the keyboard-side fixed plate 31.

When the click ball 38 and the recesses 56A, 56B are engaged, rotation of the display-side fixed plate 32 with respect to the keyboard-side fixed plate 31 may pause. Thus, when the click ball 38 and recesses 56A, 56B are engaged, the display-side housing 12 and the keyboard-side housing 13 may be seized. In an embodiment, a separation angle between the recess 56A and the recess 56B may be set at 40 degrees.

In the tilt mechanisms 43 and 44, the click balls 37, 38 may bee selectively engaged with recesses 55A, 55B, 56A, 56B which are formed on the joint member 35 so that tilt operation may be realized. Thus, to reliably perform the tilt operation, according to an exemplary embodiment the click balls 37, 38 may be brought into contact with the bearings 35A, 35B in a pressed manner.

To achieve this, a method according to an embodiment includes where the click balls 37, 38 are elastically pressed toward the bearings 35A and 35B using elastic means such as a coil spring. However, in this arrangement, in addition to the click balls 37, 38, the coil spring may be internally arranged in the keyboard-side fixed plate 31 and the display-side fixed plate 32, resulting in the hinge mechanism 30 becoming large.

In an embodiment, the joint member 35 may be formed of an elastic member. In an embodiment, the joint member 35 may be formed of hard silicone. The joint member 35 itself may be elastically deformed so that the click balls 37 and 38 can be relatively pressed against the joint member 35. Therefore, an embodiment enables a reduction of the size of the hinge mechanism 30 and reliable tilt operation. It can be noted that material of the joint member 35 is not limited to the hard silicone, and it is also possible to use other materials including those capable of pressing the click balls 37, 38 against the joint member 35 with relatively proper pressure. The other materials include, for example, rubber and the like.

Figure 6:
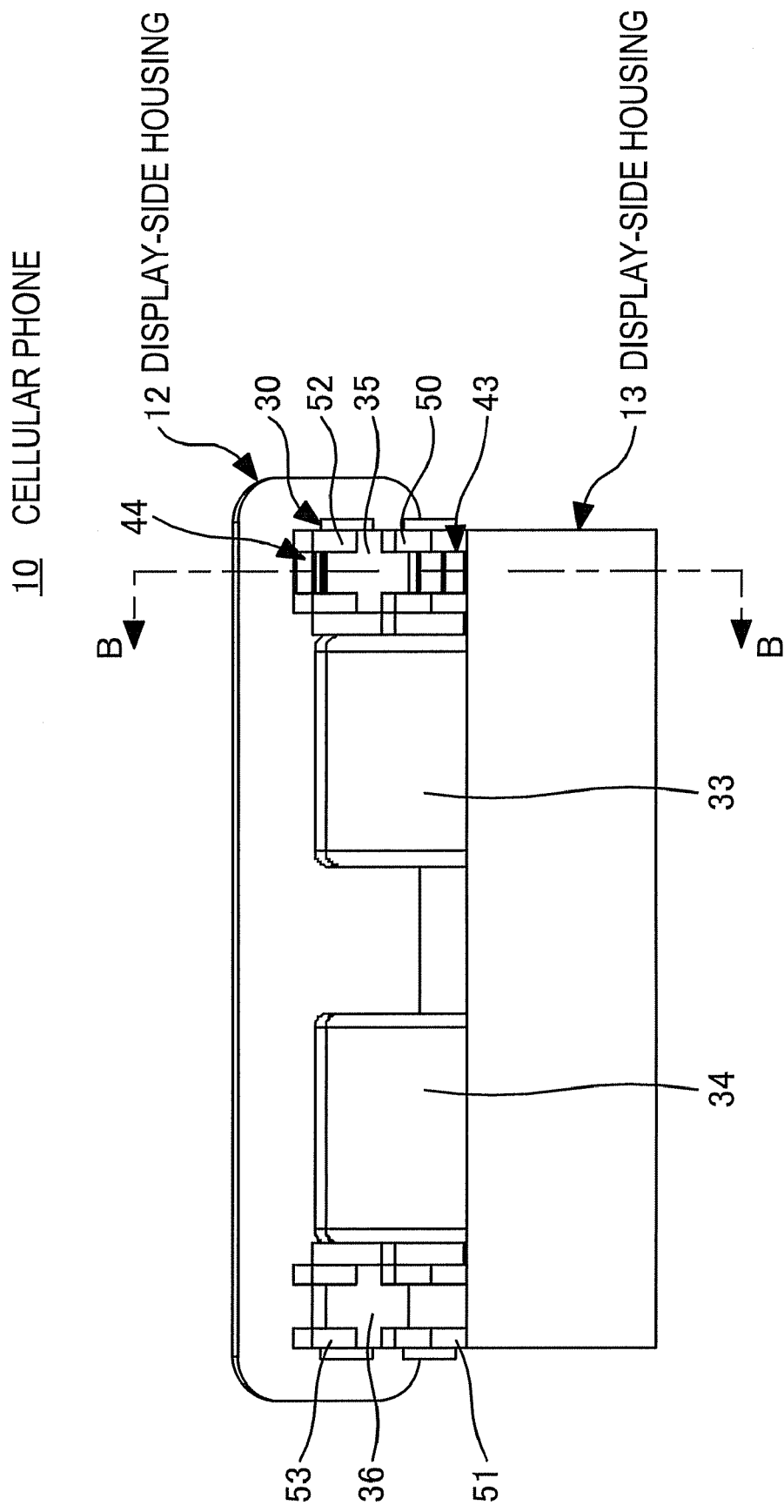
FIG. 6 illustrates a cellular phone according to an exemplary e embodiment in which a flexible joint is removed, viewed from the side on which a hinge mechanism is disposed.

An operation of the tilt mechanisms 43 and 44 including are described with reference to FIG. 7. FIG. 6 is a view of the cellular phone according to an embodiment in which its flexible joint is removed, viewed from the side on which the hinge mechanism is disposed. FIGS. 7A, 7B, and 7C are cross sectional views taken along line B-B of the hinge mechanism illustrated in FIG. 6.

FIG. 7A illustrates a state that the display-side housing 12 may be folded on the keyboard-side housing 13. In this folded state, the display-side fixed plate 32 forming the hinge mechanism 30 may be folded on the keyboard-side fixed plate 31. The angle between the keyboard-side fixed plate 31 and the display-side fixed plate 32 in this folded state is defined as 0 degrees.

When the hinge mechanism 30 is in this folded state, the click ball 37 forming the tilt mechanism 43 may be engaged with the recess 55B of the joint member 35, while the click ball 38 forming the tilt mechanism 44 may be engaged with the recess 56B.

As described above, the click ball 37 may be engaged with the recess 55B so that the joint member 35 may be seized to the keyboard-side fixed plate 31, and the click ball 38 may be engaged with the recess 56B so that the display-side fixed plate 32 may be seized to the joint member 35. Thus, the display-side fixed plate 32 (display-side housing 12) maintains the folded state with respect to the keyboard-side fixed plate 31 (keyboard-side housing 13).

FIG. 7B illustrates a state that the display-side fixed plate 32 may be opened at 120 degrees with respect to the keyboard-side fixed plate 31 from the folded state illustrated in FIG. 7A. In this open state at 120 degrees, the click ball 37 forming the tilt mechanism 43 may be engaged with the recess 55A, and the click ball 38 forming the tilt mechanism 44 is maintained in the engaged state with the recess 56B.

Further, FIG. 7C illustrates a state that the display-side fixed plate 32 is opened at 160 degrees with respect to the keyboard-side fixed plate 31 from the folded state illustrated in FIG. 7A. In this opened state at 160 degrees, the click ball 37 forming the tilt mechanism 43 maintains the engaged state with the recess 55A, and the click ball 38 forming the tilt mechanism 44 may be engaged with the recess 56A.

In an embodiment, since the keyboard-side fixed plate 31 and the display-side fixed plate 32 make the two-axis rotation, even if a large rotation of 160 degrees is made with the hinge mechanism 30, each of the rotation angles of the first axis and the second axis can be smaller than 160 degrees.

When the large rotation of 160 degrees is made with one axis, this one axis is rotated through 160 degrees. However, in an embodiment, the spindle pin 39 and the spindle pin 41 form the first axis and the spindle pin 40 and the spindle pin 42 form the second axis, and the first axis is rotated through 120 degrees and the second axis rotated through 40 degrees, whereby the hinge mechanism 30 can realize a rotation of 160 degrees in total.

In an embodiment, the flexible joint 20 made of rubber may be disposed so as to contain the hinge mechanism 30. Thus, when the large rotation with the one axis is made at one position, large load is applied to the position where the flexible joint is rotated, causing a problem such as durability. However, the arrangement of the two-axis rotation in an embodiment can lessen rotation angles of the first axis and the second axis as compared with the one-axis rotation, whereby load to the hinge mechanism 30 can be reduced.

When a tilt mechanism is provided in the arrangement of the one-axis rotation, a large load can be o applied to the tilt mechanism, and particularly, elastic parts including elasticity are seriously damaged. The elastic parts include, for example, the coil spring and the like. However, in an embodiment, elastic bias of the click balls 37, 38 in the tilt mechanisms 43, 44 may be realized by the joint member 35 being made of the elastic material such as the hard silicone. Thus, the durability can be better improved as compared with an arrangement using the elastic parts such as the coil spring.

According to an embodiment, being watertight in the connecting portion of the first housing and the second housing can be improved by the flexible joint. Further, the first housing and the second housing can be rotated with a good positional accuracy by the hinge mechanism. Furthermore, since the hinge mechanism is made watertight with the flexible joint, reliability in operation of folding the first housing and the second housing can be enhanced.

Further, according to an aspect of the embodiments, any combinations of the described features, functions and/or operations can be provided. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

The invention claimed is:

1. A mobile terminal device including a first housing, a second housing and a hinge foldably connecting the first housing and the second housing, the mobile terminal device comprising:
the hinge comprising:
a hinge mechanism which rotatably connects the first housing and the second housing; and
a flexible joint which liquid-tightly connects the first housing and the second housing and liquid-tightly contains the hinge mechanism, the flexible joint being made of rubber,
wherein the hinge mechanism further includes:
a first fixed member that is fixed to the first housing;
a joint member including a first bearing formed at one end of the joint member and bearingly supported by the first fixed member; and
a tilt mechanism that is adjustable for a fold angle between the first housing and the second housing,
wherein the tilt mechanism includes:
a first ball member that is disposed in the first fixed member and is relatively rolled on the first bearing; and
one or more first recesses which are formed on outer circumference positions of the first bearing and control rotation of the first housing and the second housing by being engaged with the first ball member.

2. The mobile terminal device according to claim 1, wherein:
the hinge mechanism further includes a second fixed member that is fixed to the second housing; and
the joint member further includes a second bearing formed at the other end of the joint member and bearingly supported by the second fixed member.

3. The mobile terminal device according to claim 2, wherein the hinge mechanism further includes:
a tubular-shaped member that is disposed between the first fixed member and the second fixed member and through which a connecting member connecting the first housing and the second housing can be inserted.

4. The mobile terminal device according to claim 1, wherein the hinge mechanism further includes:
a second fixed member that is fixed to the second housing; and
a joint member including a second bearing formed at the other end of the joint member and bearingly supported by the second fixed member;
wherein the tilt mechanism includes:
a second ball member that is disposed in the second fixed member and is relatively rolled on the second bearing; and
one or more second recesses which are formed on an outer circumference positions of the second bearing and control rotation of the first housing and the second housing by being engaged with the second ball member.

5. A mobile terminal device comprising:
a first housing;
a second housing; and
a hinge connecting the first housing and the second housing, the hinge including:
a hinge mechanism which rotatably, connects the first housing and the second housing; and
a flexible joint which liquid-tightly connects the first housing and the second housing and liquid-tightly contains the hinge mechanism, the flexible joint being made of rubber,
wherein the hinge mechanism further includes:
a first fixed member that is fixed to the first housing;
a joint member including a first bearing formed at one end of the joint member and bearingly supported by the first fixed member; and
a tilt mechanism that is adjustable for a fold angle and between the first housing and the second housing,
wherein the tilt mechanism includes
a first ball member that is disposed in the first fixed member and is relatively rolled on the first bearing; and
one or more first recesses which are formed on outer circumference positions of the first bearing and control rotation of the first housing and the second housing by being engaged with the first ball member.

* * * * *